(12) United States Patent
Yamaguchi

(10) Patent No.: US 6,323,983 B1
(45) Date of Patent: Nov. 27, 2001

(54) OPTICAL SWITCH

(75) Inventor: Shohei Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,063

(22) Filed: Mar. 10, 1999

(30) Foreign Application Priority Data

Mar. 13, 1998 (JP) .................................................. 10-063387

(51) Int. Cl.$^7$ ....................................................... G02F 1/03
(52) U.S. Cl. ............................................. 359/244; 359/108
(58) Field of Search ............................ 250/229; 359/108, 359/243, 244

(56) References Cited

FOREIGN PATENT DOCUMENTS

| 0 744 649 A2 | 11/1996 | (EP) . |
|---|---|---|
| 61-38935 | 2/1986 | (JP) . |
| 62-286017 | 12/1987 | (JP) . |
| 4-308821 | 10/1992 | (JP) . |
| 5-107573 | 4/1993 | (JP) . |
| 5-259581 | 10/1993 | (JP) . |
| 5-335691 | 12/1993 | (JP) . |
| 8-82813 | 3/1996 | (JP) . |

OTHER PUBLICATIONS

Optics vol. 27, No. 3, pp. 127(9)—133(15).
"Technical Digest" of CPT'98—International Topica 1 Workshop on Contemporary Photonic Technologies), Optical noise reduction by a semiconductor waveguide saturable absorber, Yoichi Hashimoto, et al., pp. 215–218, Jan. 12–14, 1998, In corpe ration with ICICE Electronics Society & JSAP & IEEE–LESO & OSA.

*Primary Examiner*—F L Evans
(74) *Attorney, Agent, or Firm*—Scully, Scott, Murphy & Presser

(57) ABSTRACT

An optical switch with simple circuit structure and increased a response speed is disclosed. This optical switch comprises a light combiner for combining a light signal $\lambda S$ and a control light $\lambda C$ and outputting a combined signal, and a saturable absorption type optical device provided with an input port and an output port, and outputs a light signal based on the combined light signal outputted from the light combiner. When an input power of the light signal $\lambda S$ is at a region where a light signal applied to the saturation absorption type optical device is attenuated, the light intensity of the control signal $\lambda C$ is set to the OFF state, and when the input power of the light signal $\lambda S$ is at a region where a light signal applied to said saturation absorption type optical device transmits therethrough, the light intensity of said control signal $\lambda C$ is set to the ON state.

5 Claims, 7 Drawing Sheets

OPTICAL SWITCH

BACKGROUND OF THE INVENTION

1. Field of the Invention

The present invention relates to a saturable absorption type optical switch and a method for controlling the same.

2. Description of the Related Art

With reference to this kind of saturable absorption type optical switch, its operation theory is disclosed in Technical Digest of CPT' 98 (CPT' 98=International Topical Workshop on Contemporary Photonic Technologies), "Optical noise reduction by a semiconductor waveguide saturable absorber", Yoichi Hashimoto et al., pp 215–216, Jan. 12–14, 1998, in cooperation with IEICE Electronics Society & JSAP & IEEE-LEOS & OSA. However, its practical use has not been argued yet.

Moreover, technologies existing before the present invention was made generally employ an optical switch driven by application of a current or a voltage.

FIG. 1 is a block diagram showing an example of a conventional optical switch.

As shown in FIG. 1, the conventional optical switch comprises optical divider 101 for receiving a light signal to divide it into signals and outputting them; optical switch 102 for receiving one of the two signals outputted from optical divider 101 and outputting is as a light signal according to a control signal; receiving circuit 103 for receiving the other signal of the two signals outputted from optical divider 101 and extracting a component of the control signal from a signal applied thereto; and control circuit 104 for controlling optical switch 102 depending on the control signal extracted by receiving circuit 103.

In the optical switch constructed as described above, the control signal for driving optical switch 102 is superposed on the light signal, and the light signal including the control signal superposed thereon is divided by optical divider 101. The control signal component is extracted by receiving circuit 103, and control circuit 104 is controlled by the control signal extracted. Thus, optical switch 102 is controlled.

However, since the foregoing conventional optical switch needs a circuit for extracting the control signal and a control circuit for driving the optical switch, the above described conventional optical switch has a problem that a structure of the optical switch becomes complicated.

SUMMARY OF THE INVENTION

It is an object of the present invention to provide an optical switch with simple circuit structure and increased its response speed, and a method for controlling the same.

In the present invention, constructed as described above, a saturable absorption type optical device is used. When an input power of the light signal applied to the optical switch by the saturable absorption type optical switch is at a region where the light signal is attenuated, the light intensity of the control signal is set to the OFF state. When the input power of the light signal applied to the optical switch by the saturable absorption type optical device is at a region where the light signal transmits through, the light intensity of the control signal is set to the ON state. Thus, the light intensity of the light signal to be outputted is controlled.

As described above, since the saturable absorption effect of the saturable absorption type optical device is utilized and the light intensity of the light signal is controlled according to the light intensity of the control signal, the circuit structure of the optical switch can be simplified and its response speed can be increased.

Furthermore, in the present invention, when a transmission path is provided, remote control of the saturable absorption type optical device becomes possible.

Furthermore, since the pass switching section of the optical switch is not mechanically constructed, its reliability is enhanced.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

First Embodiment

Figure 1:
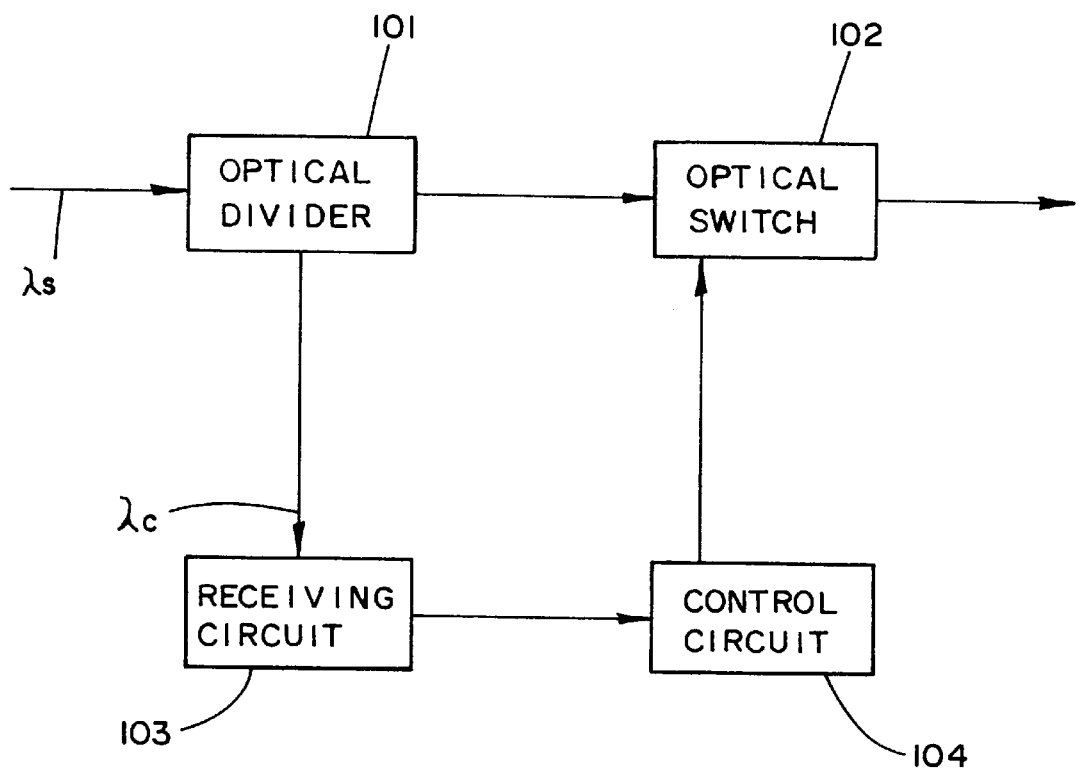
FIG. 1 is a block diagram showing a construction example of a conventional optical switch.
Figure 2:
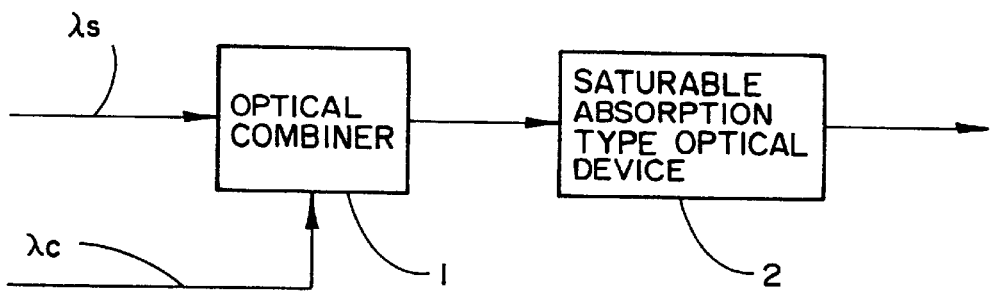
FIG. 2 is a block diagram showing a first embodiment of an optical switch of the present invention.

As shown in FIG. 2, the optical switch of the first embodiment comprises optical combiner 1 for combining a light signal $\lambda S$ and a control light $\lambda C$ applied from the outside for outputting the combined light signal; and saturable absorption type optical device 2 having input and output ports, which outputs a light signal according to the light signal outputted from optical combiner 1 thereto. It should be noted that in optical combiner 1, a widely known optical fiber coupler and the like are used. Moreover, the control light λC is controlled so as to be set in the ON/OFF states under predetermined conditions.

Figure 3:
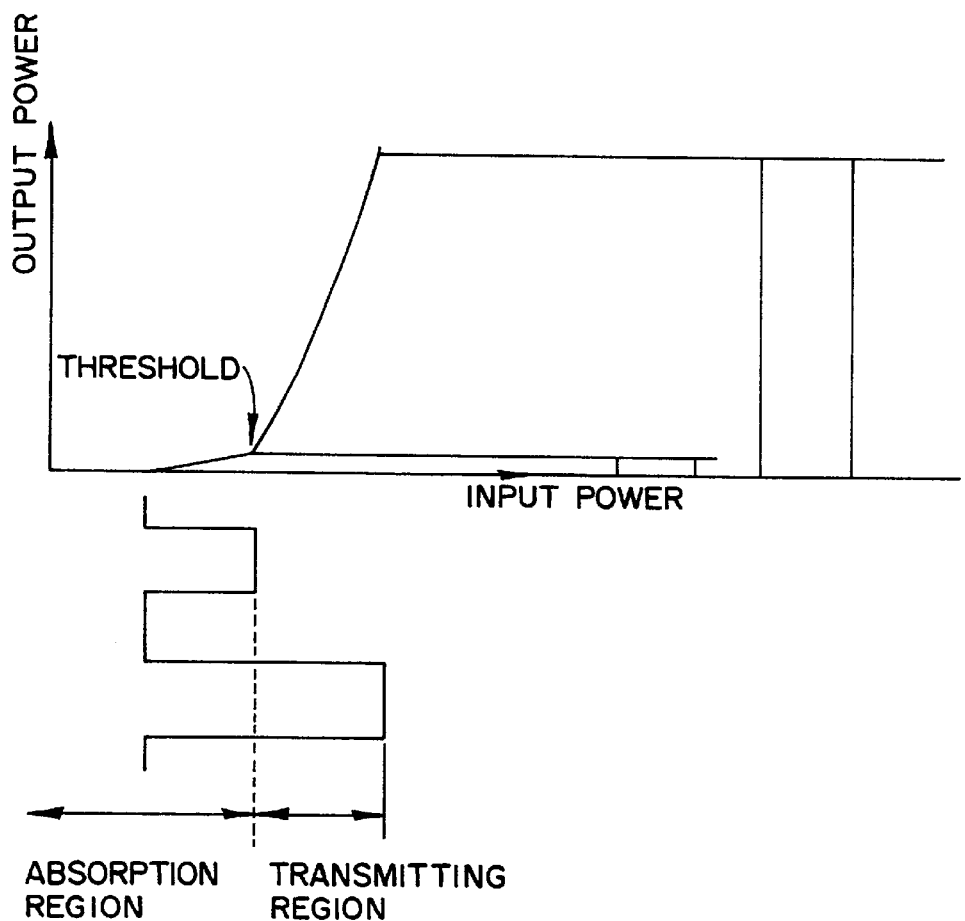
FIG. 3 is a figure showing an example of a characteristic of the saturable absorption type optical device shown in FIG. 2.

As shown in FIG. 3, saturable absorption type optical device 2 of this embodiment utilizes the saturable absorption effect of a semiconductor optical device, and exhibits a nonlinear transmission characteristic which depends on the intensity of a light outputted thereto. Specifically, when a light signal exhibiting a low light intensity is outputted to optical device 2, the light signal undergoes strong absorption and attenuates (absorption region). When a light signal exhibiting a high light intensity is applied to optical device 2, optical device 2 is saturated by the light signal and light signal exceeds its absorption capability, so that the light signal applied to optical device 2 transmits through it (transmitting region).

An operation of the optical switch constructed as is described above will be described below.

Figure 4A:
FIG. 4a is a timing chart of a light signal $\lambda S$ for explaining the operation of the optical switch shown in FIGS. 2 and 3.
Figure 4B:
FIG. 4b is a timing chart of a control signal $\lambda C$ for explaining the operation of the optical switch shown in FIGS. 2 and 3.
Figure 4C:
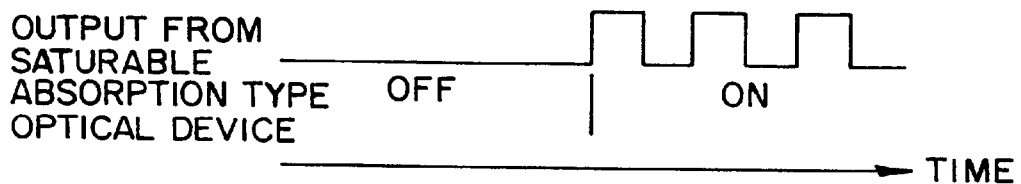
FIG. 4c is a timing chart of a light signal which is outputted from saturable absorption type optical device 2 for explaining an operation of the optical switch shown in FIGS. 2 and 3.

FIG. 4a is a timing chart of the light signal λS for explaining an operation of the optical switch shown in FIGS. 2 and 3. FIG. 4b is a timing chart of the control light λC for explaining an operation of the optical switch shown in FIGS. 2 and 3. FIG. 4c is a timing chart of the light signal outputted from saturable absorption type optical device, which is for explaining an operation of the optical switch shown in FIGS. 2 and 3.

First, when the control light λC is in the OFF state, only the light signal λS is outputted from optical combiner 1, and only the light signal λS is applied to saturable absorption type optical device 2. At this time, if the input power of the light signal λS is at the absorption region shown in FIG. 3, the light signal λS is absorbed, so that the light signal λS does not transmit through optical device 2.

On the other hand, when the control light λC is in the ON state, the light signal λS and the control light λC are combined with each other by optical combiner 1, leading to simultaneous inputting of the signals λS and λC to saturable absorption type optical device 2. At this time, if an input power obtained by totalizing the input powers of both signals λS and λC is at the transmitting region shown in FIG. 3, the combined light signal is not absorbed by optical device 2 and transmits therethrough.

As described above, the light intensity of the control signal λC is set to an OFF state when the light signal λS should be blocked by the saturation type optical device, the light intensity of the control signal λC is set to an ON state when the light signal λS should transmits through the saturation absorption type optical device.

Second Embodiment

Figure 5:
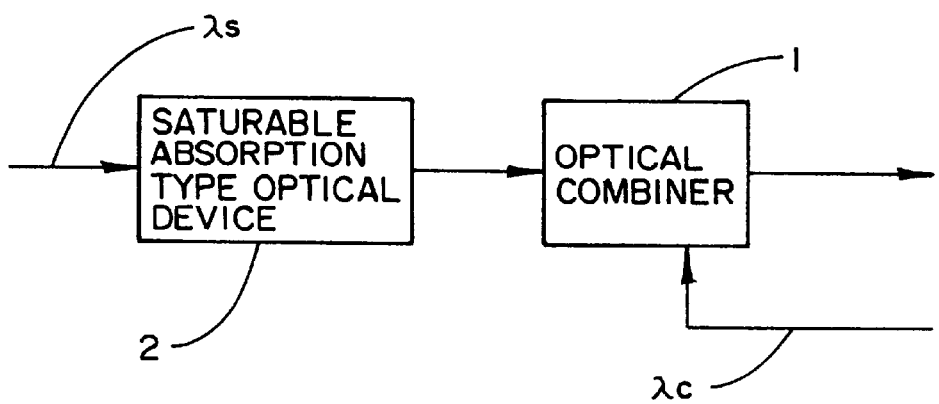
FIG. 5 is a block diagram showing a second embodiment of an optical switch of the present invention.

As shown in FIG. 5, the optical switch of this embodiment differs from that of the first embodiment in that optical combiner 1 and saturable absorption type optical device 2 are arranged with their positions reversed from the first embodiment. In the optical switch of the first embodiment, the light signal outputted from saturable absorption type optical device 2 is combined with the control light λC applied to optical device 2 by optical combiner 1, and the combined light signal is outputted from optical combiner 1.

Also in this embodiment, when the input power of the light signal λS is at the absorption region shown in FIG. 3, if the control light λC is set to the OFF state, the light signal which is attenuated by saturable absorption type optical device 2 is canceled by the control light λC in optical combiner 1, so that no light signal is outputted.

On the other hand, when the input power obtained by totalizing the input powers of the light signal λS and the control light λC is at the transmitting region shown in FIG. 3, if the control light λC is set to the ON state, the light signal transmitting through saturable absorption type optical device 2 is combined with the control light λC by optical combiner 1, and the combined light is outputted from optical combiner 1.

Third Embodiment

Figure 6:
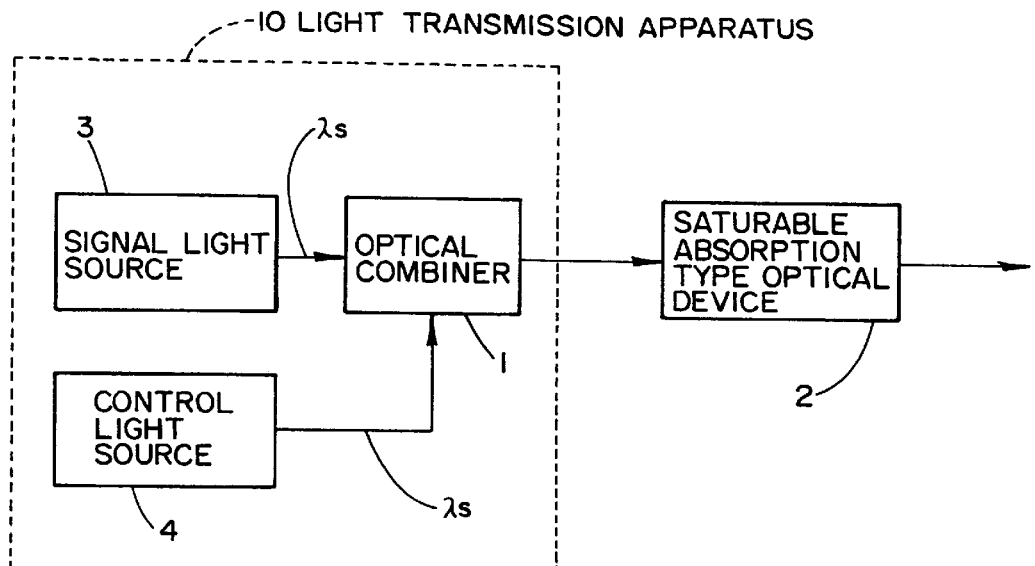
FIG. 6 is a block diagram showing a third embodiment of an optical switch of the present invention.

As shown in FIG. 6, the optical switch of this embodiment has a structure in which optical combiner 1 is arranged in light transmission apparatus 10 in which signal light source 3 for outputting a light signal λS and control light source 4 for outputting a control light λC are provided. The optical switch of this embodiment is constructed so that the light signal outputted from the light transmission apparatus 10 is applied to saturable absorption type optical device 2. The light intensity of the light signal is controlled on the transmitting side of the light signal.

Fourth Embodiment

Figure 7:
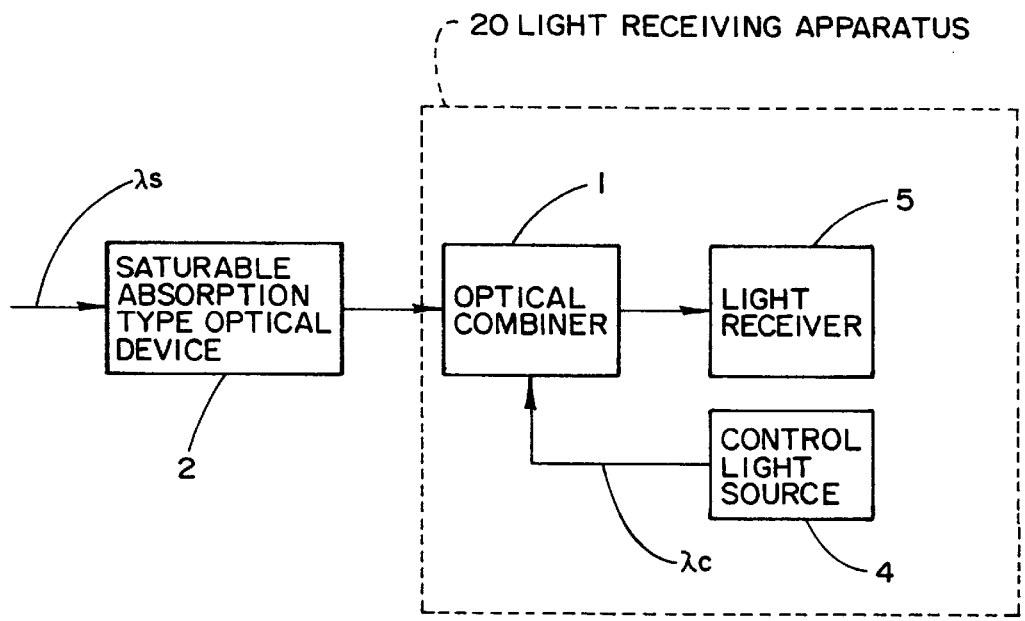
FIG. 7 is a block diagram showing a fourth embodiment of an optical switch of the present invention.

As shown in FIG. 7, the optical switch of this embodiment is constructed so that optical combiner 1 is arranged in light receiving apparatus 20 in which control light source 4 for outputting a control signal λC and light receiver 5 for receiving the light signal are provided. The light intensity of the light signal is controlled on the receiving side of the light signal.

Fifth Embodiment

Figure 8:
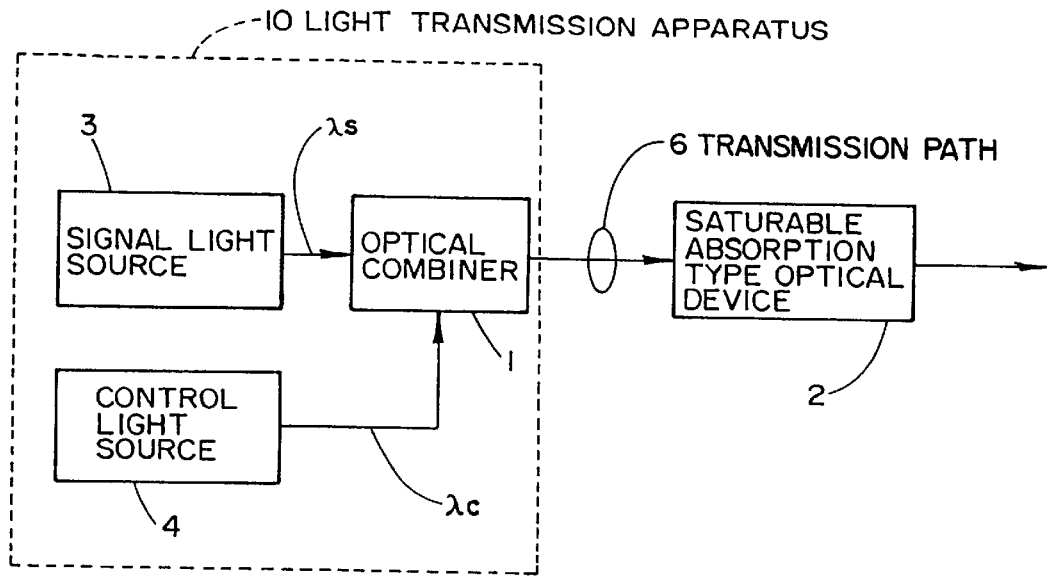
FIG. 8 is a block diagram showing a fifth embodiment of an optical switch of the present invention.

As shown in FIG. 8, the optical switch of this embodiment has a structure in which transmission path 6 is provided between light transmission apparatus 10 and saturable absorption type optical device 2, and constructed so that a light signal outputted from light transmission apparatus 10 is transmitted to saturable absorption type optical device 2 through transmission path 6.

In the optical switch constructed as described above, saturable absorption type optical device 2 can be controlled from a remoter position.

Sixth Embodiment

Figure 9:
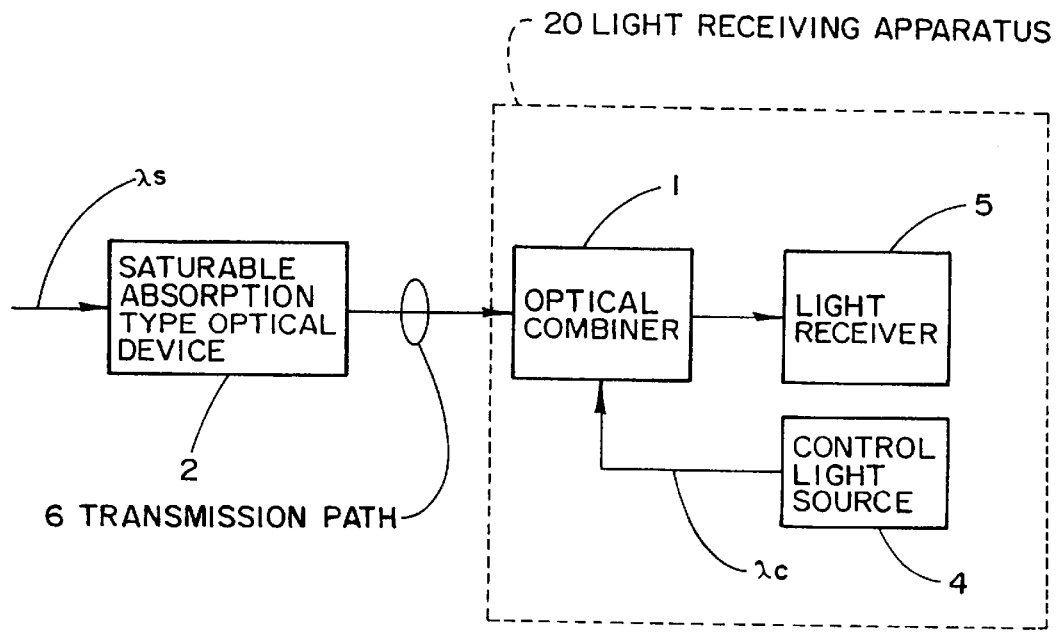
FIG. 9 is a block diagram showing a sixth embodiment of an optical switch of the present invention.

As shown in FIG. 9, the optical switch of this embodiment has a structure in which transmission path 6 is provided between light receiving apparatus 20 and saturable absorption type optical device 2.

In the optical switch constructed as described above, saturable absorption type optical device 2 can be controlled from a remote position.

Seventh Embodiment

Figure 10:
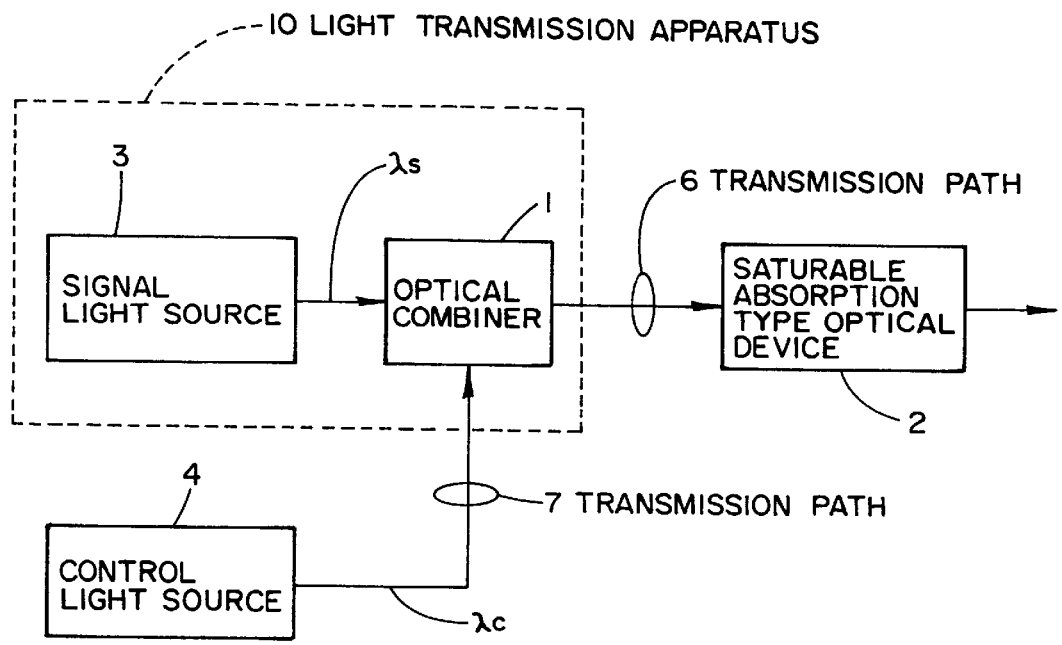
FIG. 10 is a block diagram showing a seventh embodiment of an optical switch of the present invention.

As shown in FIG. 10, the optical switch of this embodiment has a structure in which control light source 4 shown in FIG. 8 is provided outside of light transmission apparatus 10, and control light source 4 and optical combiner 1 are connected through transmission path 7.

In the optical switch constructed as described above, the control light λC is applied to light transmission apparatus 10 from another apparatus, and the light intensity of the light signal outputted from saturable absorption type optical device 2 is controlled.

Eighth Embodiment

Figure 11:
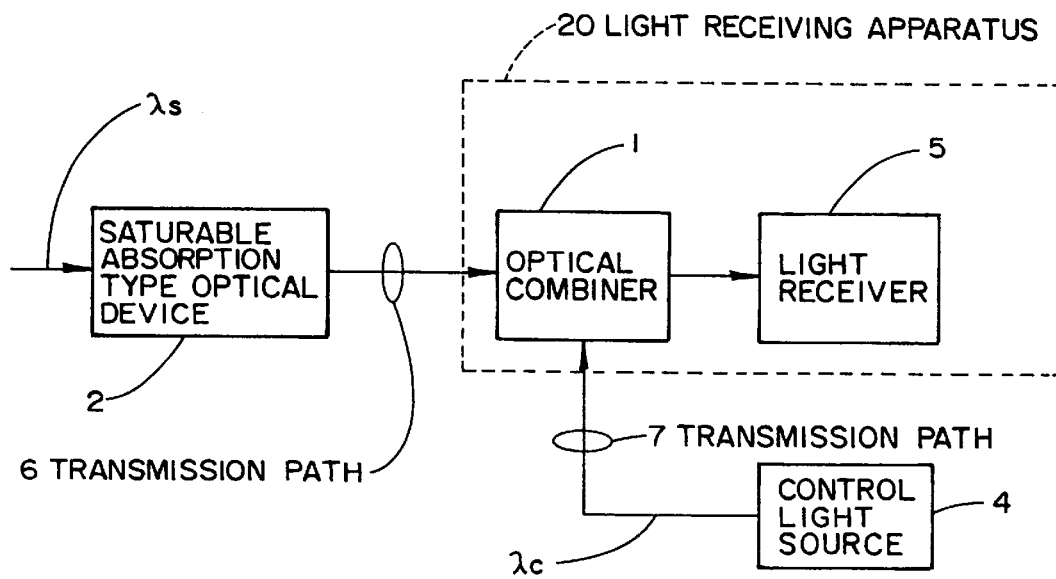
FIG. 11 is a block diagram showing a eighth embodiment of an optical switch of the present invention.

As shown in FIG. 11, the optical switch of this embodiment has a structure in which control light source 4 is provided outside of light receiving apparatus 20 and the control light source 4 and optical combiner 1 are connected through transmission path 7.

In the optical switch constructed as described above, the control light λC is applied to light receiving apparatus 20 from another apparatus, and the light intensity of the light signal outputted from saturable absorption type optical device 2 is controlled.

Ninth Embodiment

Figure 12:
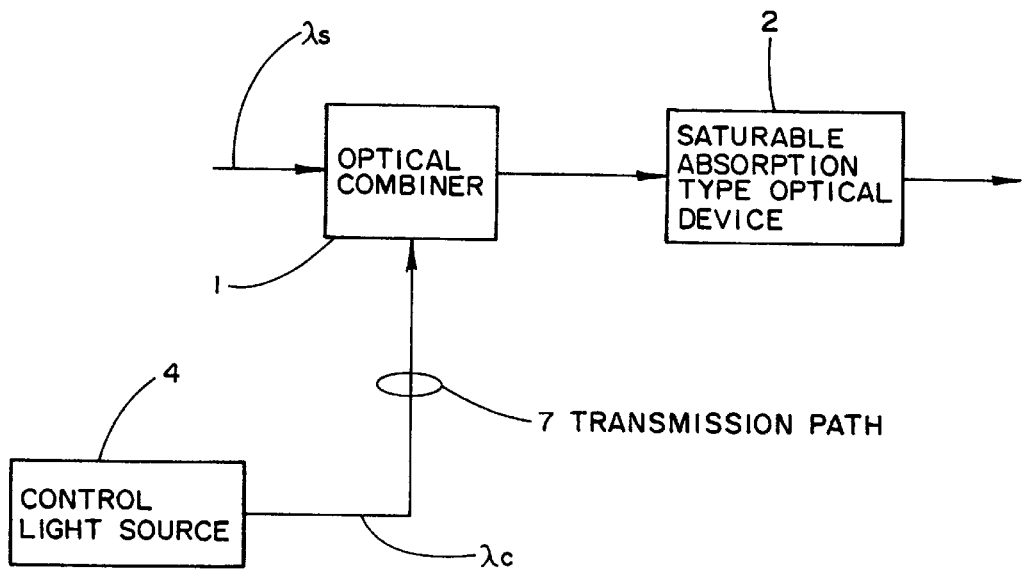
FIG. 12 is a block diagram showing a ninth embodiment of an optical switch of the present invention.

As shown in FIG. 12, the optical switch of this embodiment has a structure different from that of the optical switch shown in FIG. 2 in that the control light λC applied to optical combiner 1 is supplied from control light source 4 which is connected to optical combiner 1 through transmission path 7.

In the optical switch constructed as described above, the control light λC is applied to optical combiner 1 from a remote position, and the light intensity of the light signal outputted from saturable absorption type optical device 2 is controlled.

Tenth Embodiment

Figure 13:
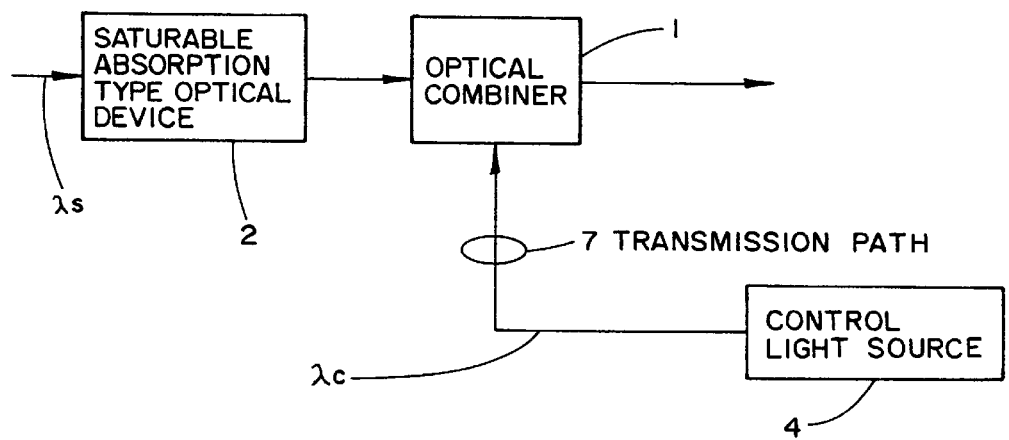
FIG. 13 is a block diagram showing a tenth embodiment of an optical switch of the present invention.

As shown in FIG. 13, the optical switch of this embodiment has a structure different from that of the optical switch shown in FIG. 3 in that the control light λC applied to optical combiner 1 is supplied from control light source 4 which is connected to optical combiner 1 through transmission path 7.

In the optical switch constructed as described above, the control light λC is applied to optical combiner 1 from a remoter position, and the light intensity of the light signal outputted from saturable absorption type optical device 2 is controlled.

While a preferred embodiment of the present invention has been described using specific terms, such description is for illustrative purpose only, and it is to be understood that change and variations may be made without departing from the spirit or scope of the following claims.

What is claimed is:

1. An optical switch comprising:

a saturable absorption type optical device provided with an input port and an output port, and outputs a light signal based on an inputted light signal; and a optical combiner for combining a light signal outputted from said saturable absorption type optical device with a control signal whose a light intensity controlled under predetermined conditions and outputting a combined light.

2. The optical switch according to claim 1, further comprising:

a light receiver for receiving a light signal outputted from said optical combiner; and a control light source for generating a control signal applied to said optical combiner, wherein a light receiving apparatus is constituted by said optical combiner, said light receiver and said control light source.

3. The optical switch according to claim 2, wherein said light receiving apparatus and said saturable absorption type optical device are connected to each other through a transmission path.

4. The optical switch according to claim 2, further comprising:

a light receiver for receiving a light signal outputted from said optical combiner; and a control light source for generating a control signal applied to said optical combiner, wherein a light receiving apparatus is constituted by said optical combiner and said light receiver, and said light receiving apparatus and said saturable absorption type optical device are connected through a first transmission path, and said light receiving apparatus and said control light source are connected through a second transmission path.

5. The optical switch according to claim 1, further comprising:

a control light source for generating said control signal applied to said optical combiner, wherein said optical combiner and said control light source are connected to each other through a transmission path.

* * * * *